Figure 1:
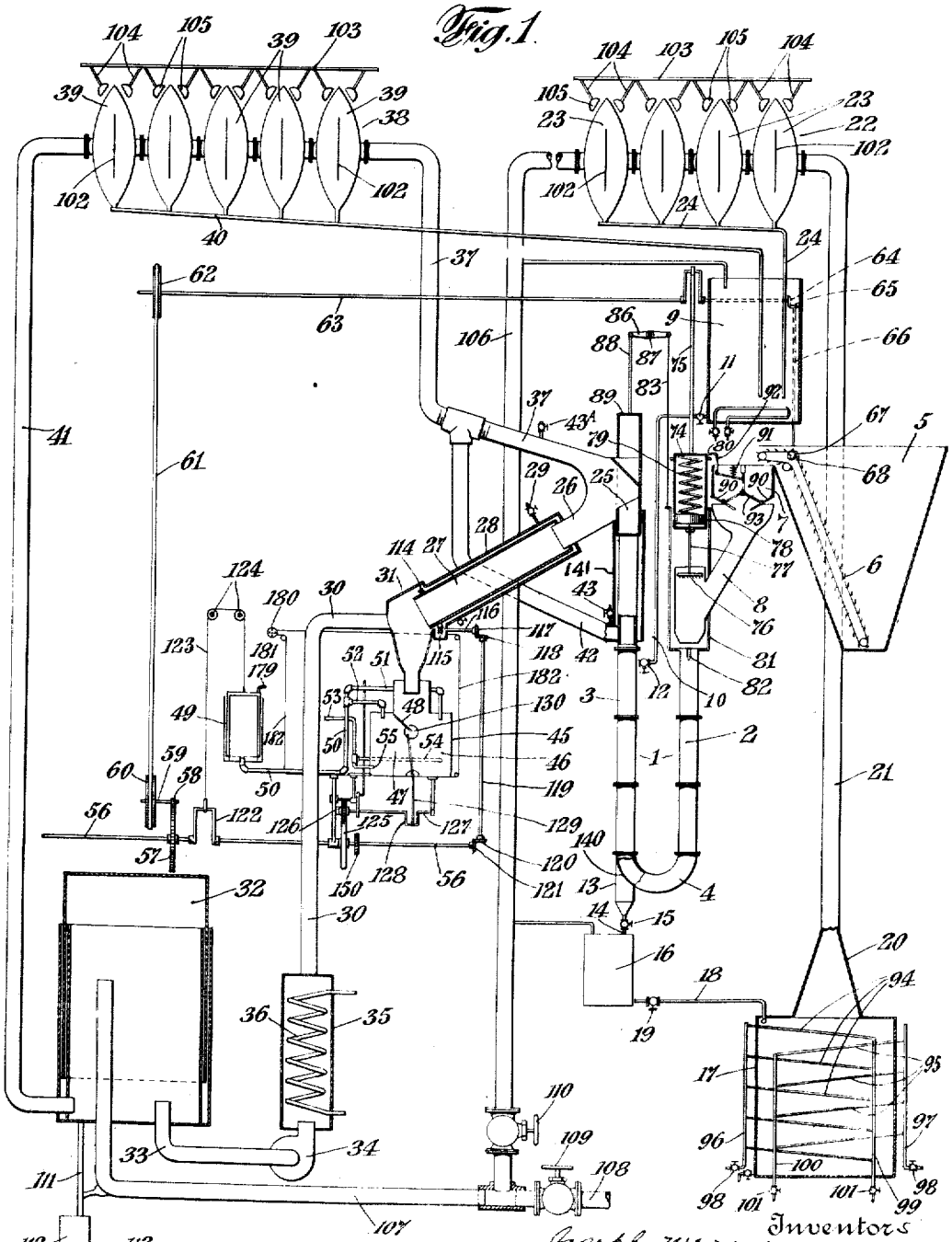

Jan. 1, 1924

J. McMAHON ET AL 1,479,145

EXTRACTION OF SOLUBLE CONSTITUENTS OF MATERIALS

Filed March 8, 1920

3 Sheets-Sheet 1

Inventors
Joseph McMahon,
James A. McMahon,
By their Attorneys
Kenyon & Kenyon

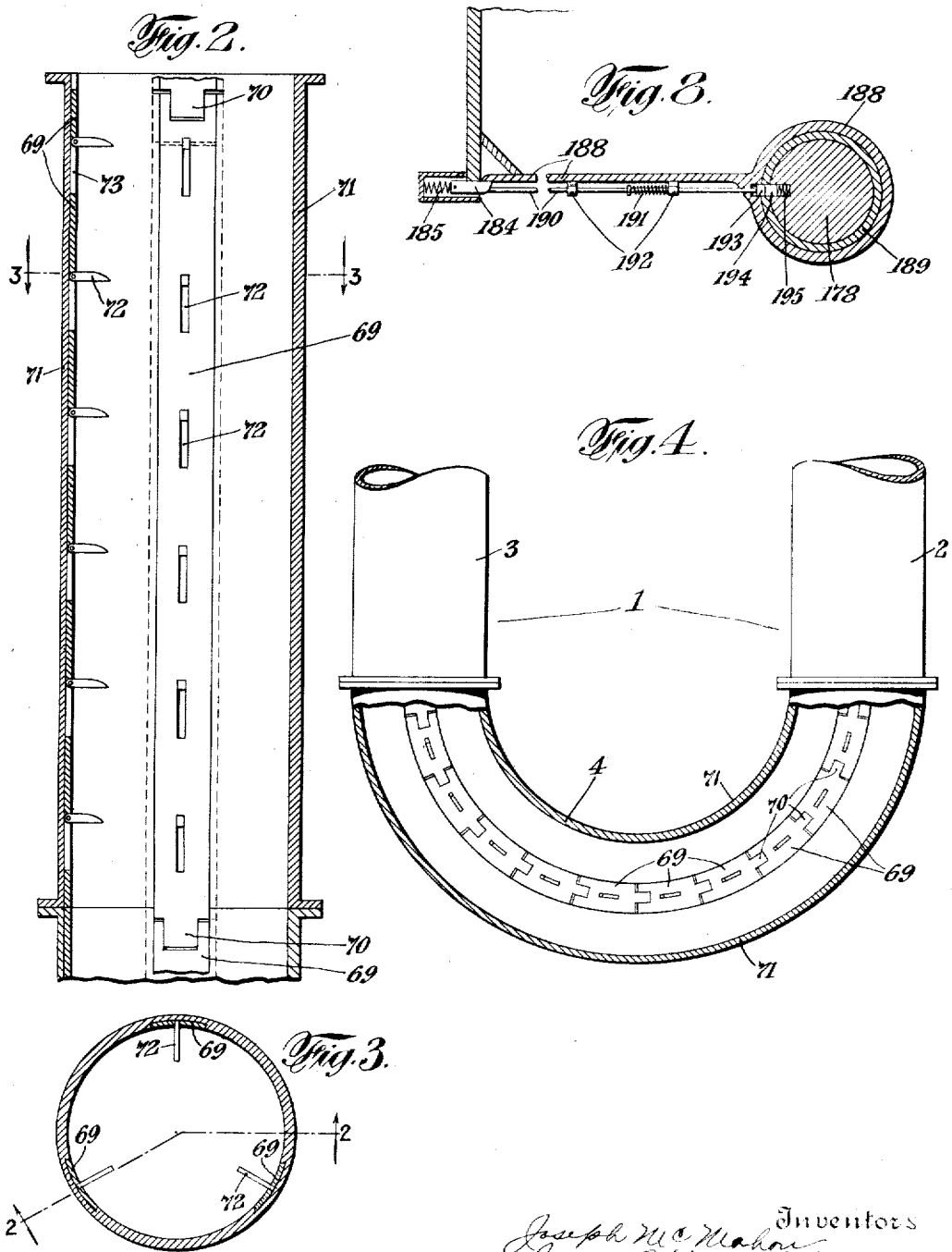

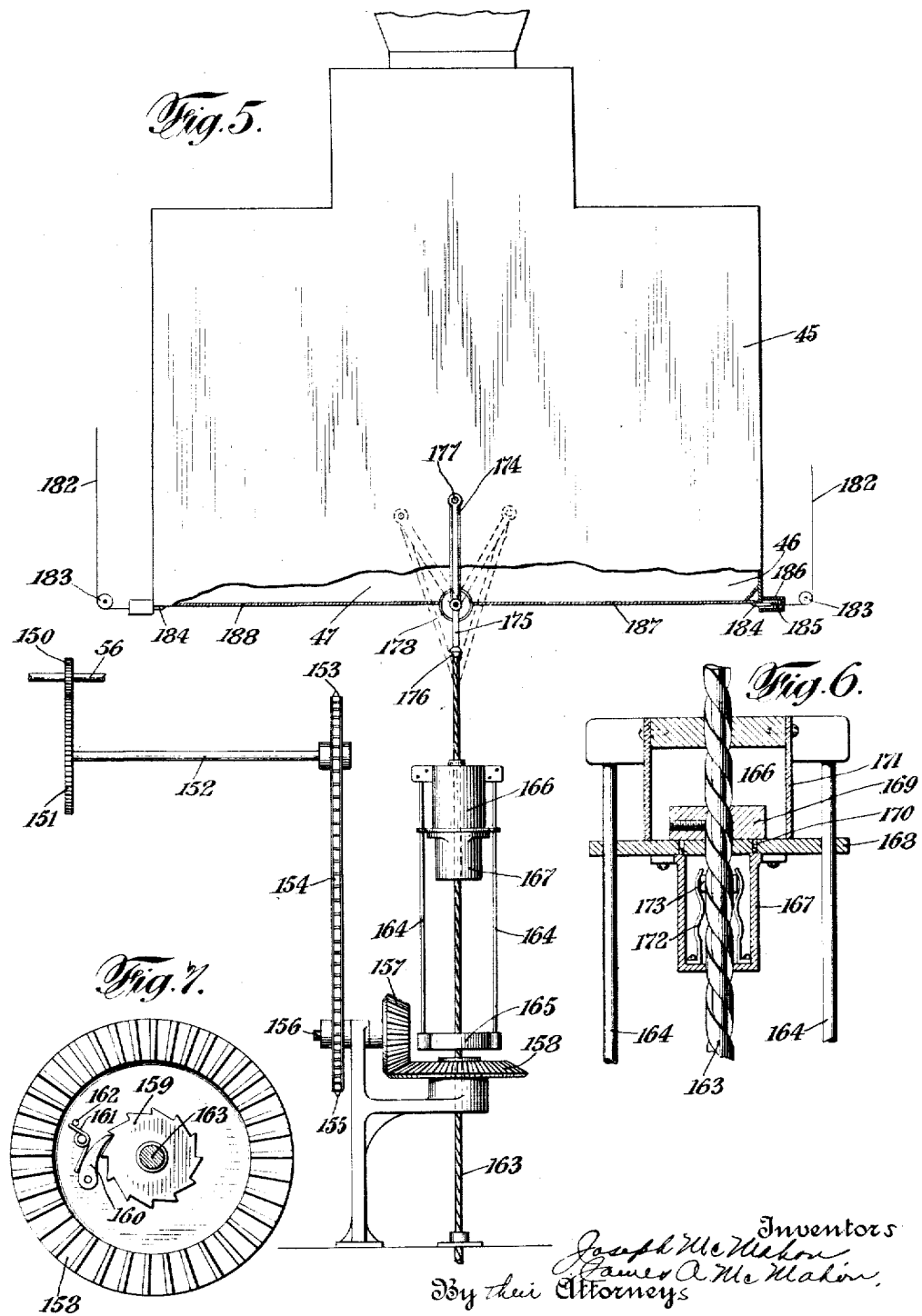

Patented Jan. 1, 1924.

1,479,145

UNITED STATES PATENT OFFICE.

JOSEPH McMAHON AND JAMES A. McMAHON, OF BROOKLYN, NEW YORK.

EXTRACTION OF SOLUBLE CONSTITUENTS OF MATERIALS.

Application filed March 8, 1920. Serial No. 364,152.

*To all whom it may concern:*

Be it known that we, JOSEPH MCMAHON and JAMES A. MCMAHON, citizens of the United States, and residents of Brooklyn, in the county of Kings and State of New York, have invented a new and useful Improvement in the Extraction of Soluble Constituents of Materials, of which the following is a specification.

Our invention relates to the extraction of soluble constituent from materials containing it. It has for its object to provide new and improved processes and means for such extraction, and especially processes and means adapted for performing such extraction on a continuous and large scale; for conserving the agents used therein and using them over and over again indefinitely without material loss; and for increasing the efficiency and output of extraction methods and insuring safety in their performance. It consists of the novel processes and apparatus herein disclosed.

In the methods and devices heretofore used for extraction of soluble constituent from materials it has been found difficult or impossible to make one method and apparatus serve for the extraction of different soluble constituents from different materials containing them, and it has been found practically impossible to perform such extraction continuously and on a large scale. In such attempts it has been found difficult or impossible to make the percolation of the menstruum, or active agent used for dissolving the soluble constituent, through the material treated thorough, without waste of the menstruum, leading to waste of energy, material and loss of time. By our improved process and means we are enabled to carry on on a large commercial scale a continuous system of extraction without appreciable loss of menstruum, in a rapid and economical manner and without waste of energy and material, and to obtain more thorough percolation, separation of the soluble constituent, and with better results generally.

Our improvement is applicable to the extraction of soluble constituent from many different substances or materials, it being understood, of course, that the agents employed will vary widely in character, strength, proportion, etc. with the different materials treated and the different soluble constituents to be removed from them. Our invention is thus of general application and is not limited to the specific material or soluble constituent of the example hereinafter given. But for the purpose of clearness, and by way of illustration only, we shall describe our process as applied to the extraction of grease from wool. From this illustration the application of our improved process and means to the extraction of the same or other soluble constituents from other materials will be obvious, with the proper changes made in the particular cases as to the agents used, their proportions, strength, etc.

Our process can be carried out by any suitable apparatus, but we have shown in the drawings accompanying this specification, and forming part of it, an apparatus which we have found well adapted to carry it out.

Referring to the specific apparatus shown in the drawings, Fig. 1 is a diagrammatic view of one form of apparatus suitable for carrying out our improved process. In order to illustrate our entire apparatus on a single sheet this figure has been made merely a diagrammatic one on a small scale, and many of the details of the apparatus are omitted. Fig. 2 is a central vertical section through a portion of the percolator. Fig. 3 is a horizontal cross-section on the line 3—3 of Fig. 2. Fig. 4 is a view partly in elevation and partly in vertical section of the curved portion of the percolator and feeding tube. Fig. 5 is a detail of the mechanism connected with the discharge of the residue from the discharge tanks. Figs. 6 and 7 and 8 are details of the same mechanism.

We will first describe in a general way the various steps of our improved process as carried out in connection with the apparatus shown in the drawings, and particularly with reference to the extraction of grease from wool. The material to be treated, wool containing grease, is conveyed in one direction through a passageway, and a suitable menstruum, in this case tetrachloride of carbon, preferably at a temperature of 70° C., is supplied to the other end of the passageway and flows through it in the opposite direction, percolating through the wool and dissolving the grease contained in it. As shown, the passageway is a U-shaped tube 1, consisting of a percolator portion proper, upright limb or tube 3, and a feeding portion, upright or vertical limb 2, the two limbs 2 and 3 being connected by a lower curved portion 4. The wool contained in a hopper 5 is automatically fed by endless belt 6 into a hopper 7 from which it passes through a tube 8 into feeding tube 2. It is then conveyed intermittently down through this tube through the curved portion 4 and into and up through the percolator 3. Meanwhile a supply of the menstruum, in this case tetrachloride of carbon, is continuously fed from a menstruum tank 9 through pipe 10 controlled by cocks 11 and 12 into percolator 3, whence it passes down in a steady stream through percolator 3, then through curved portion 4 into feeding tube 2, meeting the stream of material. In the process the material is continuously, or substantially so, passing through the passageway in one direction while the stream of menstruum is continuously passing through the material in it in the opposite direction, working its way through the material and thoroughly percolating through it and dissolving the soluble constituent, grease. The effect of this stream of menstruum as it passes up feeding tube 2 is thoroughly to displace the air enmeshed in the material, wetting and saturating the material with the menstruum and extracted matter, causing the subsequent percolation and dissolution of soluble constituent to be more readily and thoroughly accomplished. The process of percolation and dissolution proper is carried on during the subsequent passage of the material upward through percolator tube 3.

The percolator is discharged from a downward extension 13 of tube 3 through a pipe 14 controlled by cock 15 into a percolate tank 16. To permit the passage of the percolate into extension 13 and at the same time to prevent the material from entering the extension, the lower portion of the left hand end of curved tube 4 is provided with numerous small holes at point 140, making that portion of the tube, in effect, a diaphragm. The holes are not shown in the drawings but are arranged at and around the point 140. It is essential to make the process a continuous one so that the solvent be recovered from the percolate as fast as it collects and be returned to the system for further use. For this purpose we use, as shown, a still 17 into which the percolate passes from tank 16 through a pipe 18 controlled by a cock 19 and in which still the percolate is heated and the solvent is volatilized and passes off as a vapor, and the extract is drawn off as desired. The details of the still will subsequently be explained.

The solvent, in the form of a vapor, passes up from still 17 through a hood 20 into pipe 21, and thence passes to a condenser 22 where it is condensed. The condenser is shown as composed of a plurality of sections 23 connected with one another. The liquid solvent is discharged from each section at the highest temperature possible into a pipe 24 which conducts it back to the menstruum supply tank 9, whence it issues to be used over again in the process.

The residue or marc passes further up percolator 3 and is discharged at the upper end 25. There will be some of the menstruum remaining in the residue and this we remove by any suitable method or means and recover for further use. In the apparatus shown in the drawings this is accomplished by heating the residue, agitating it, and passing through it a heated inert gas such, in the present illustration, as atmospheric air. In the particular devices shown in the drawings the residue is discharged into an enlarged tube 26 through which it passes into a revolving cylinder 27, steam jacketed as at 28 and heated by steam through a steam supply pipe 29 in any suitable manner. The residue slides downward through the cylinder 27 in which it is agitated and during its passage through it a heated inert gas is passed upward through it from a pipe 30 which opens into an enlarged discharge chamber 31 and passes into cylinder 27.

A supply of inert gas for this purpose is contained in the gasometer or supply tank 32 which is built in the usual gasometer style to rise and fall with the pressure. The inert gas is withdrawn from the gasometer 32 through a pipe 33 by a fan, and passes into cylinder 35 containing a steam coil 36 which heats the inert gas. The heated gas then passes upward through pipe 30 into the cylinder as above described. This gas must be inert to the extent that it does not affect the menstruum used or the residue of the material treated. This heated gas in passing through the residue, aided by the heating and agitation imparted to the residue, thoroughly volatilizes all menstruum that may be still remaining in the residue, and the gas and the volatilized menstruum together pass up through tube 26 through pipe 37 into condenser 38 where it is cooled and the solvent liquefied. This condenser is also shown as composed of a number of sections 39 connected to one another and each having an outlet at the bottom into a pipe 40. The liquefied menstruum flows from the sections into pipe 40 and back to menstruum supply tank 9. The inert gas, cooled to air temperature, passes from the condenser through pipe 41 back to the gasometer 32.

The upper portion of tube 3, is preferably steam-jacketed as shown at 141, this jacket extending from a point slightly above cock 12 to discharge point 25.

42 is an additional pipe, which may or may not be used, connecting with the steam-jacketed portion of limb 3 for permitting any volatilized menstruum to escape into pipe 37. Pipes 42 and 37 are controlled by cocks 43 and 43ᴬ. Pipe 42 we prefer to use in cases where it is unnecessary to use a heating cylinder such as 27. In our improved processes when in full operation, the inert gas becomes saturated at room temperature, with menstruum vapor, but in passing from tank 32 to cylinder 27 it is heated so that in passing through the residue it has the capacity for taking up an additional quantity of menstruum vapor which is later discharged by it into condenser 38. Tank 32 is made very large relatively to the capacity of the rest of the apparatus. In practice its capacity should preferably be something like ten times the capacity of all the other enclosed parts of the apparatus. It is also in direct connection with all parts of the apparatus. Thus, it provides a safeguard against any dangerous excess of pressure from arising in the system due to the volatilization of liquid menstruum or the expansion of gases.

The residue may be discharged from the enlarged end 31 in any suitable way. In order to permit a continuous discharge without interfering with the operation of the parts in the process, we have shown two discharge chambers alternately put into operation to receive the discharge of residue and later to discharge it. For this purpose tank 45 is shown as composed of two distinct chambers 46 and 47. In the apparatus the discharge is shown as being made into chamber 46, a swinging door 48 closing the entrance to chamber 47. At the proper time this door is swung to the right closing chamber 46 and opening chamber 47. When chamber 46 is filled the door is swung, closing chamber 46. This chamber is now filled with residue in which may be mingled some menstruum vapor. In order to recover this we preferably provide a holding tank 49 arranged on the gasometer principle. Pipe 50 runs from tank 49 and has two branches 51 running to chamber 46, and 52 running to chamber 47, controlled by cocks (not shown). These branches open into the upper part of the chambers. Branch pipes 54 and 55 connect respectively with chambers 46 and 47 near the bottom. These pipes are controlled by cocks (not shown) which are operated by the driving mechanism of the machine, as also are the cocks of pipes 51 and 52, in such a way that just before the discharge of the residue from a discharge chamber air is drawn into the said chamber through either pipe 54 or 55 through the expansion tank 49, which draws into itself and holds any menstruum vapor and inert gas in the chamber or in the residue in the chamber, the air entering the pipes 54 and 55 taking the place of the vapor and gas withdrawn. For this purpose pipes 54 and 55 are connected with pipe 53 which opens into the air. The cocks in the various pipes and the operating mechanism for operating them at the proper time, are not shown in the drawings as any suitable form may be used, and as the details of such apparatus form no part of our invention. After the gas and vapor are thus withdrawn from the discharge chamber, the residue in the chamber is discharged through the gate at the bottom, by apparatus the details of which will be presently described. At the proper time after such discharge the gate at the bottom of the discharge chamber is closed. Thereupon the driving mechanism causes the holding tank to contract, the proper cocks to be operated, and the gas and vapor held in the holding tank to be forced through pipe 50, and through pipe 51 or 52, as the case may be, into the top of the discharge chamber, forcing out the air in such chamber through pipe 54 or 55 and pipe 53. Before this is done gate 48 is thrown over to close the discharge chamber at the top. At the proper time the same process is repeated with the other chamber. The discharge of the residue is thus accomplished without loss of inert gas or menstruum vapor, and air is prevented from entering the system.

After our process has become started, it is automatic and continuous in operation. The feed of material into feeding tube, although intermittent at the top, is practically continuous throughout the percolator. The supply of menstruum is constant after being regulated to the conditions of the particular extraction taking place, and so is the discharge of percolate and the supply of inert gas. All of the solvent and inert gas employed are recovered and used over and over again without any material loss. At the beginning of the operation the inert gas absorbs a certain amount of the menstruum vapor which it retains, but otherwise there is practically no loss of either menstruum or inert gas. The process can be carried on on a large scale, the percolation is thorough and efficient, extracting all of the soluble constituent, and the process is rapid and economical in operation.

We will now describe some of the details of different parts of the apparatus heretofore omitted by us. The various driven parts of the apparatus are preferably driven from a common source of power. This is illustrated only diagrammatically in Fig. 1, many of the details of which forming no part of our invention being omitted. Referring to this power mechanism 56 represents a main driving shaft driven from any suitable source of power. Power is transmitted to endless belt 6 from driving shaft 56 through gears 57 and 58, spindle 59 and gear 60 on the same spindle, belt 61, gear 62, on shaft 63, bevelled gear 64 on the other end of the shaft, bevelled gear 65 on shaft 66 and a bevelled gear on its end (not shown), connecting with a similar bevelled gear (not shown) on the end of a shaft 67, having a sprocket wheel 68 driving endless belt 6 in the usual way (details of this not being shown).

Our improved means for conveying the material through the percolator passageway consists in making a part of the inner walls of the passageway intermittently reciprocating, while the remaining parts of the inner walls are stationary. We have found that by such means it is possible to convey or carry material through tubes. Heretofore, as far as we are aware, it has been impossible to do this with many materials, especially where elastic or springy or of a nature adapted to cohere or clog. In many cases great power is needed, and in others it is practically impossible. By our device we have found that material even of the above character can be readily conveyed through tubular passageways with little expenditure of power.

Referring to the details shown (see Figs. 2, 3 and 4) 69 are sections or panels pivoted or otherwise flexibly connected together as at 70, and countersunk into the outer walls 71 of tubes 2, 3 and 4 as shown in Fig. 3. These sections are arranged vertically one above another and flexibly connected so as to form a movable panel which reciprocates upward and downward through a certain prescribed stroke. Any number of these panels may be used, and the relative area of the panels compared to the area of the stationary inner walls of the tube, will be varied with different materials treated. In the case of some materials the area of movable panel to that of stationary inner wall should be larger than in other cases. In the case of the treatment of wool we have found that the proportions of area of the movable to the stationary parts of the inner walls should be about equal.

In the case of some materials, especially those of a resilient character like wool, we have found it preferable to also employ loosely pivoted fingers 72 (Figs. 2 and 3). These fingers are pivoted to the panels 69 at various points and are adapted either to project into the tube or to move down into apertures 73 in the panels so that they will lie about level with the surface of the panel. When the panels are moved downward in feeding tube 2 or upward in percolator tube 3, these fingers will catch in the material and project into the tube and assist in the forward movement of the material and will assist on the return movement to some extent to prevent the material from springing backward. We have found in practice that these fingers need not be used with many materials. We have also found that in place of them the inner surface of the panels may, in some cases, be roughened in places.

A reciprocating movement is given to the panels by means of a hollow cylinder 74 connected by a crank shaft 75 to shaft 63. 76 is a plunger preferably having a rough or brush-like lower surface connected by rod 77 to a piston 78 working in cylinder 74. 79 is a spring tending to compress the piston 78 to the lower end of the cylinder. 80 is a rim or flange projecting outward from the upper part of cylinder 74. During the downward stroke of crank shaft 75 flange 80 strikes the upper part of a hollow cylinder 81 open at its top and bottom, and forces it downward. This cylinder is connected with the movable panels inside of feeding tube so as to force them downward in its downward movement. The details of this connection are not shown in the drawing, but any suitable connections may be employed, such as a rod from one side of the cylinder to the other passing through a slot in the outer walls 71 of feeding tube 2. The lower part of this slot is shown at 82. A flange at the top of cylinder 81 is connected by a rod 83 with a lever 86 pivoted (not shown) at 87 and carrying at its other end a rod 88 connected with panels in an airtight cylinder 89. These panels in cylinder 89 are connected to the panels in tube 3. As they are similar to the latter panels, they are not shown. By this means an upward pull is made upon the panels in tube 3 at the same time that the panels in tube 2 are forced downward, thus assisting in the movement of the panels throughout the percolator and feeding tubes.

In order to prevent the continuous feeding from hopper 5 from interfering with the reciprocating movements of the various parts in tube 2, we provide gates for temporarily closing pipe 8 until plunger 76 has returned to its upper position. These gates are shown at 90. They are normally held closed by a spring 91, the gates in Fig. 1 being shown as in the process of being opened. They are opened toward the end of the upward stroke of cylinder 74 by flange 80 striking lever 92, rocking it on its pivot and forcing gates 90 downward, by means of the intermediate toggle joint 93.

The operation of the feeding and conveying devices is as follows: When cylinder 74 starts in its downward movement it first releases lever 80, permitting spring 91 to close gates 90. The material being fed in from the hopper is thereafter retained by these gates during the downward and upward movement of cylinder 74 to prevent interference with the movement of the parts. Flange 80 of cylinder 74 strikes the upper part of cylinder 81, forcing it downward, and also through spring 79 forcing plunger 76 downward. The latter engages the material that has been fed into tube 2 forcing it downward and compressing it to the desired degree for percolation. Cylinder 74 through cylinder 81 forces panels 69 downward the full length of their determined stroke. On the upward movement of crank shaft 75 the panels are moved upward to their original position, the fingers, if any, being retracted during the upward operation. When the lower part of cylinder 74 reaches piston 78, which in the latter part of the downward stroke had been compressed upward in the cylinder against the spring, it carries upward the piston 78, and with it plunger 76. It will be noted that plunger 76 remains down until after the panels have practically completed their upward stroke, thus preventing these panels from causing any upward movement of the material in the tube. At the last of its upward stroke cylinder 74 trips lever 80 and gates 90 are thrown open, permitting a fresh batch of material to be introduced into tube 2.

Any suitable still may be used for volatilizing the solvent. As the apparatus is intended for percolation in very large quantities it is necessary to have a still of large capacity. In the still shown 94 and 95 are two sets of hollow steam heated pans, the two sets extending from opposite sides of the still slightly downward and ending at a point near the other wall. Steam is supplied to these sets of pans through pipes 96 and 97 respectively, each provided with a cock 98. 99 and 100 are steam exhaust pipes, each controlled by a valve 101. The percolate enters through pipe 18, falls upon uppermost plate 94, and drips from its outer end on to plate 95, and from then on to the next plate 94, and so on.

Each condenser 23 and 39 is preferably arranged with a plurality of sections which may be increased or diminished to suit the requirements of any particular case. The passage of the menstruum vapor through the condenser is interfered with, made slower and longer, by means of baffle plates 102 arranged opposite the entrance end in each section. Any suitable cooling means may be employed. That shown consists of a source of supply of cooling fluid such as cold water, pipe 103. The cooling fluid passes through branch pipes 104 into spraying devices 105 of any suitable character, which, in the form shown, spray the cold fluid upon the upper part of each section of the condenser.

106 is a pipe leading from the left hand end of condenser 22 for the return of any inert gas, and uncondensed menstruum vapor to pipe 107, and thence to gasometer 32. 108 is a pipe to supply additional inert gas whenever needed in the system. 109 is a valve for controlling this supply and 110 a valve for controlling pipe 106.

In case any liquid should collect in tank 32, it will run off through pipe 111 into tank 112, whence it may be withdrawn at any time through pipe 113.

Cylinder 27 can be rotated by any suitable means. Those shown consisted of a gear 114 on the exterior lower end of the cylinder meshing with a gear 115 on the spindle 116, the latter having at its end a bevelled gear 117 meshing with bevelled gear 118 on shaft 119, the latter having a bevelled gear 120 meshing with bevelled gear 121 on the main driving shaft 56.

Holding tank 49 is operated intermittently at the proper times through crank arm 122, on main driving shaft 56 through pulley rope 123 running over pulleys 124.

Gate 48 is operated at regular stated intervals by means of mutilated gear 125 on main shaft 56 operating gear 126, the latter turning shaft 127, crank arm 128, and rod 129, connected to disc 130 upon which gate 48 is mounted.

The particular means shown in the drawings for opening and closing the doors 187 and 188 forming the floors of the discharge chambers 46 and 47, respectively, and for doing this at the proper time, are illustrated in Figs. 5, 6, 7 and 8. The two doors are held locked in normal position each by a catch 184 enclosed in a cylindrical socket 186, and held outward in locking position normally by spring 185. Each catch is withdrawn at the proper time by means of the driving mechanism of the machine as follows: On the top of holding chamber 49 is a projecting pin 179 which toward the close of the upward movement of the chamber strikes one of the pins 181 on a disc 180, rotating it slightly. Fastened to this disc is a cord 182 which has two branches, one running to each discharge catch over pulleys 183. This withdraws the catch at the proper time.

When a catch is withdrawn the weight of the residue in the discharge chamber causes the corresponding door to rotate on its centre 178 where it is pivoted. After the residue has been all discharged this door is rotated backward into position and is caught by the latch. The apparatus for permitting downward rotation, causing the upward rotation, is briefly as follows: Arm 174 is fast on pivot point 178 and at its outer end 177 is pivoted to an angle arm 175, forming a ball joint 176 at its other end connecting it to a screw-threaded spindle 163. 158 is a mitre gear, through the centre of which spindle 163 passes loosely. Mitre gear 158 is continuously driven from main driving shaft 156, through gears 150, 151, shaft 152, sprocket 155 mounted on shaft 156, through mitre gear 157, mounted on the same shaft, meshing with mitre gear 158. The spindle 163 and mitre gear 158 are so connected that when the spindle moves downward it is not connected at all with the mitre gear but as soon as it reaches its lowest position it is connected at once and is raised to its former position by the rotation of the gear. The mechanism for this consists of the ratchet wheel 159 screw-threaded to engage with the screw threads on spindle 163. This ratchet is caused to rotate through pawl 160, held in engagement by means of a spring 161 pivoted by its centre and held against a stop 162. The rotation of mitre gear 158 in one direction, driven in a clockwise direction, will turn the ratchet 159 and through it tends to raise the spindle. When the spindle is freed by the opening of the door the downward motion of the spindle is permitted by its rotating ratchet 159 independently of the gear. When the spindle stops rotating it is immediately raised by the gear acting through ratchet 159.

We provide a stationary frame consisting of a block 165 and hollow cylinder 166, the two connected by guides 164. The spindle passes through the centre of these. The spindle carries with it a frame 168 having openings encircling the guides 164. 168 carries on its lowest side a hollow cylinder 167 having an opening in its lower portion for the passage of the spindle. The spindle 163 has a pin 173 driven through it which projects on each side as shown in Fig. 6. Cylinder 167 carries two springs 172 having offsets to engage with the projecting heads of pin 173. This holds part 168 to the spindle and causes part 168 to drop and rise with the spindle. 169 is a block integral with cylinder 166 and carrying pins 170 adapted to project into corresponding openings in 168. In the upper position of spindle 163 the heads of pin 173 are opposite the upper offset of springs 172. In the downward movement of the spindle and its parts the lower part of cylinder 167 strikes plate 165, causing the spindle 163 in its slight further movement downward to shift the heads of pin 173 to the lower offset of the springs. On the return upward movement the plate 168 strikes block 169 and the heads of pin 173 are shifted into alignment with the upper offset. The further movement of spindle 163 insures the riding of the door over the catch, so that it will be secured in its locking position.

In order to prevent the wrong door from opening or both doors from opening at the same time, we have provided the locking device shown in Fig. 8. 190 is a rod free to move in guides 192. The outer end of rod 190 bears against the inner end of catch 184. 191 is a spring secured to the rod at one end and bearing against one of the guides 192. 193 and 194 are two loose lock tumblers slidable in a groove in hinge 178 and encircling loose sleeve 189 and the sleeve of door 188. Spring 185 of latch 184 normally presses rod 190 inward against spring 191, and also against the tumblers, and a spring 195 tending to force the tumblers outward. When latch 184 is withdrawn rod 190 follows it through action of spring 191. Tumblers 193 and 194 also follow through the action of spring 195, until the outer tumbler 193 reaches the outer end of the recess. At this point the division line between the two tumblers registers with the circumference of loose sleeve 189. This permits the rotation of the door on its pivot. The other door remains locked because its catch 184 has not been withdrawn. Of course it will be understood that a duplicate of this locking apparatus shown in Fig. 8 is provided for the other door.

In the lower curved part of feeding tube 2 the flexible sections 69 are preferably made shorter and are curved as shown in Fig. 4 so as readily to turn on a curve in their reciprocating movement.

The devices shown in the drawings are automatic in operation. While the driving means are merely shown diagrammatically it will be understood that the various parts of the driving mechanism will be so arranged and proportioned as properly to time the various operations carried on in different parts of the apparatus. Thus for example, the size of the discharge chambers 46 and 47 will be so proportioned to the amount of each charge introduced into the feeding tube that the discharge chambers will discharge automatically after they have received an amount equal to a specified number of the charges. For example, they could be so arranged as to discharge once for each ten fresh charges introduced. In the same way, the other parts of the machinery are proportioned and timed in accordance with the demands of the particular apparatus. As these are matters of mere adjustment they will not be further described.

The apparatus so far has been described as to its operation, as the operation takes place after the apparatus has been started and is in full continuous and automatic operation. In practice, when using a granular or powdered matter, the apparatus is set into operation preferably by introducing into feeding tube 2 some material, such as a wad of oakum, of size sufficient to give the required resistance to hold the first charge of material and to cause the feeding mechanism in its first stroke properly to pack the material. Tubes 3 and 2 are then filled with menstruum up to about half their height. The driving machinery is then started into operation. After the apparatus is in full operation cock 12 will be opened just enough to give the supply of liquid menstruum required in the regular operation, and cocks 15 and 19 will be opened to just the proper amount to permit the percolate to run off at the rate at which it is produced. If desired, glass gauges may be connected to tubes 2 and 3 to indicate the height at which the menstruum stands in the tubes in order to observe and control the operation.

In our improved system the menstruum and the inert gas are used over and over again, practically indefinitely, without loss. As far as they are concerned, ours is substantially a closed system, but because of the large capacity of the gasometer in the way of expansion and contraction, and its direct connection with all parts of the system, it is free from the dangers of a closed system.

In our improved still the long and broad level surfaces of the slightly-inclined plates permit a thin stream of the percolate to run steadily and smoothly, preventing objectionable foaming, and affording a large distillation capacity in a relatively small space. The dropping of the liquid from plate to plate is of further assistance in this work.

In our improved condensers the arrangement is such as to produce a fractional condensation of the menstruum at a number of points. This we accomplish by means of a series or battery of individual condensers, each preferably of two saucer shapes and arranged on edge and facing each other and having baffles, each condenser discharging directly into the menstruum tank. This is important as it returns the menstruum to the tank as hot as possible. Thus a large part of the menstruum will be returned from the first saucer-shaped condenser, toward the right in the drawing and in a very hot state; considerably less from the next condenser and at a cooler temperature, and so on. But by means of our improved condenser most of the menstruum will be returned in the hottest possible condition. If desired, a steam jacket may be provided for the menstruum tank itself.

What we claim as new and desire to secure by Letters Patent, is:

1. A process of extracting soluble constituent from material containing it which comprises or includes the passing of a continuous flow of volatile menstruum in one direction through a continuous stream of material to be treated moving in the opposite direction to dissolve the soluble constituent from such material, heating the residue as it is discharged and passing through it an inert gas, saturated at atmospheric temperature with the menstruum vapor and thereafter heated to remove from the residue the menstruum remaining therein, cooling the combined inert gas and menstruum vapor to condense menstruum therefrom, returning the menstruum for further use in the process, and reheating it for further use in the process.

2. A continuous process of extracting soluble constituent from material containing it which consists in conveying the material to be treated downward through a passageway and then upward through a continuation of the passageway, continuously passing through the said passageway in the opposite direction first downward and then upward, a stream of menstruum to dissolve the soluble constituent from the material, discharging the percolate, distilling the menstruum from the extract, condensing the menstruum vapor and returning it as liquid menstruum for further use in the process, discharging the residue from the passageway, heating and agitating it, passing through it while heated and agitated a continuous stream of inert gas, saturated at atmospheric temperature with menstruum vapor and thereafter heated, to remove from the material any menstruum remaining therein, cooling the inert gas to condense therefrom the excess menstruum vapor absorbed by it while passing through the residue, returning the condensed liquid menstruum for further use in the process, returning the cooled inert gas and re-heating it for further use in the process, and discharging the residue.

3. A continuous process of extracting soluble constituent from material containing it which consists in conveying the material to be treated downward through a passageway and then upward through a continuation of the passageway, continuously passing through the said passageway in the opposite direction first downward and then upward, a stream of menstruum to dissolve the soluble constituent from the material, discharging the percolate, distilling the menstruum from the extract, condensing the menstruum vapor and returning it as liquid menstruum for further use in the process, discharging the residue from the passageway, heating and agitating it, passing through it while heated and agitated a continuous stream of inert gas, saturated at normal temperature with menstruum vapor and thereafter heated, to remove from the material any menstruum remaining therein, cooling the inert gas to condense therefrom the excess menstruum vapor absorbed by it while passing through the residue, returning the condensed liquid menstruum for further use in the process, returning the cooled inert gas and reheating it for further use in the process, and discharging the residue into a closed compartment filled with inert gas, displacing the inert gas from the residue with air, and discharging the residue from the closed compartment.

4. In a continuous process of extracting soluble constituent from material containing it, removing any menstruum remaining in the residue after extraction of the soluble constituent by passing heated inert gas through such residue, discharging the residue into a closed compartment filled with inert gas, displacing from such compartment such inert gas and any inert gas remaining in the residue with air, and discharging the residue from the closed compartment.

5. In a continuous process of extracting soluble constituent from material containing it, removing any menstruum remaining in the residue after extraction of the soluble constituent by passing heated inert gas through such residue, discharging the residue into a closed compartment filled with inert gas, displacing from such compartment such inert gas and any inert gas remaining in the residue with air, and discharging the residue from the closed compartment, closing the compartment, filling it with inert gas, and repeating the operation.

6. A continuous process of extracting soluble constituent from material containing it in a substantially closed system, which consists in furnishing a substantially continuous supply of material to be treated, dissolving the soluble constituent therefrom by means of a menstruum, continually supplied from a source of supply in the system, removing the dissolved soluble constituent, distilling the menstruum therefrom, condensing it and returning it to the system for further use, removing any menstruum remaining in the residue by means of an inert gas, at atmospheric temperature saturated with the menstruum gas but thereafter heated, by passing such heated inert gas through the residue, cooling the combined inert and menstruum vapor to condense the latter therefrom into liquid menstruum, and returning the latter for further use, returning the cooled inert gas to a reservoir of large dimensions and capable of expanding and contracting according to the pressure in the system, reheating the inert gas, repassing it through other residue as discharged and continuing the operation, whereby a continuous process of extraction will be maintained without loss of the agents employed therein, and without danger from excessive pressure in the system due to heating or cooling or both.

7. In a system for continuously extracting soluble constituent from material containing it by means of a volatile menstruum, means for continuously supplying such material, a menstruum tank, means for continuously drawing liquid menstruum therefrom and bringing it into contact with said material for extraction purposes, means for separating menstruum vapor from the extract and leading it to a condenser, a condenser for condensing the menstruum vapor containing a plurality of individual condensing sections, connected together serially, and a pipe from each section for the condensed menstruum to pass direct to the menstruum tank of the system.

8. In a system for continuously extracting soluble constituent from material containing it by means of a volatile menstruum, means for continuously supplying such material, a menstruum tank, means for continuously drawing liquid menstruum therefrom and bringing it into contact with said material for extraction purposes, means for separating menstruum vapor from the extract and leading it to a condenser, a condenser for condensing the menstruum vapor containing a plurality of individual condensing sections arranged in series, a supply pipe for the menstruum vapor connected with the first section, a pipe between adjoining sections for leading the vapor from one section to the next one, a baffle arranged in each section to obstruct the flow of the vapor, and a pipe from each section for the condensed menstruum to pass direct to the menstruum tank of the system.

9. In a system for continuously extracting soluble constituent from material containing it by means of a volatile menstruum, means for continuously supplying such material, a menstruum tank, means for continuously drawing liquid menstruum therefrom and bringing it into contact with said material for extraction purposes, means for separating menstruum vapor from the extract and leading it to a condenser, a condenser for condensing the menstruum vapor containing a plurality of individual condensing sections arranged in series, each section composed of two saucershaped parts with the rims facing each other and integral and the parts vertically arranged, a verticle baffle plate occupying the central part of said section, a supply pipe for the menstruum vapor connected with the first section, a pipe between adjoining sections for leading the vapor from one section to the next one, and a pipe from each section for the condensed menstruum to pass direct to the menstruum tank of the system.

10. In a continuously percolating system the combination of means for leading a continuous stream of percolate to a still, and a still for volatilizing the menstruum vapor from the percolate, comprising a series of broad and deep and slightly tipped hollow plates, arranged vertically one above another with adjacent plates tipped in different directions, and each plate adapted to receive the percolate along its higher edge and discharge it along its lower edge upon the plate below, means for leading steam to the hollow space in each plate along the higher edge and withdrawing it and the moisture of condensation from along the lower edge, and means for removing the extract and menstruum vapor.

In testimony whereof we have signed our names to this specification.

JOSEPH McMAHON.
JAMES A. McMAHON.